United States Patent [19]
Petersen et al.

[11] Patent Number: 5,553,230
[45] Date of Patent: Sep. 3, 1996

[54] IDENTIFYING CONTROLLER PAIRS IN A DUAL CONTROLLER DISK ARRAY

[75] Inventors: Mark D. Petersen; Barry J. Oldfield, both of Boise, Id.

[73] Assignee: Hewlett-Packard Company, Palo Alto, Calif.

[21] Appl. No.: 375,097

[22] Filed: Jan. 18, 1995

[51] Int. Cl.$^6$ .................................................. G06F 11/34
[52] U.S. Cl. ................ 395/180; 364/238.4; 364/DIG. 1; 395/182.03
[58] Field of Search ............................... 395/182.07, 180, 395/182.03; 364/238.4, 238.3, 240.5

[56] References Cited

U.S. PATENT DOCUMENTS

| | | | |
|---|---|---|---|
| 4,688,172 | 8/1987 | Wright | 364/200 |
| 4,958,270 | 9/1990 | McLaughlin et al. | |
| 5,140,592 | 8/1992 | Idleman et al. | 395/182.06 |
| 5,155,835 | 10/1992 | Belsan | 395/425 |
| 5,195,100 | 3/1993 | Katz et al. | 371/66 |
| 5,237,658 | 8/1993 | Walker et al. | 395/200 |
| 5,278,838 | 1/1994 | Ng et al. | 371/10.1 |
| 5,287,462 | 2/1994 | Jibbe et al. | 395/275 |
| 5,289,418 | 2/1994 | Youngerth | 365/201 |
| 5,297,258 | 3/1994 | Hale et al. | 395/275 |
| 5,379,417 | 1/1995 | Lui et al. | |
| 5,437,022 | 7/1995 | Beardsley et al. | 364/200 |

*Primary Examiner*—Robert W. Beausoliel, Jr.
*Assistant Examiner*—Albert DeCady
*Attorney, Agent, or Firm*—Lane R. Simmons

[57] ABSTRACT

In a disk storage system having dual controllers and mirrored memory therebetween, a controller identification system provides a unique system identifier (ID) data (number, password, etc.) accessible by both controllers for determination of which controller is MASTER. This identifier is physically mounted in a location that will always remain with the disk array and will always remain accessible by the controllers. Typically, a read-only memory (ROM) stores the identifier. During initialization, each controller reads this system identifier and compares it to a respective controller identifier previously stored in a non-volatile memory area of each controller. If the system identifier matches the controller identifier, the controller has not been moved and, therefore, has a valid memory image and may have previously been a MASTER controller. A MASTER bit signal is then checked; and, if it is set, the controller was previously the MASTER controller and will continue as MASTER controller. If the identifiers do not match, the controller is a new arrival and the system identifier is stored in the controller non-volatile memory for reference upon the next initialization.

20 Claims, 2 Drawing Sheets

IDENTIFYING CONTROLLER PAIRS IN A DUAL CONTROLLER DISK ARRAY

FIELD OF THE INVENTION

This invention relates in general to computer disk storage controllers and, more particularly, to a controller pair identification system for mirrored memory controllers in a dual controller disk storage system.

BACKGROUND OF THE INVENTION

In high reliability computer disk storage systems, there is a desire to have redundancy in all the physical parts which make up a subsystem to reduce the potential for loss of data and down time upon failure of a part. The use of dual disk storage controllers, each having its own memory, provides several major benefits to a disk storage system. For example: (1) a redundancy of storage information is retained to allow for recovery in the case of failure or loss of one controller or its memory; (2) repair of a disabled controller during operation is feasible due to the failover capabilities of a secondary controller; and (3) greater system up time is achieved through the secondary controller being available.

With the desire for more performance out of these redundant subsystems, caching, and the use of memory as temporary storage has become commonplace. The use of real time, synchronized, redundant memory (mirrored memory) in dual controllers can improve speed and accuracy in the case of a failover from one controller to the other.

Determination of who is a MASTER controller in a dual controller system is vital for preserving the integrity of the mirrored memory contents. Namely, when a computer disk array contains two controllers controlling a common array, a decision must be made during initialization as to which controller has a valid memory image so that the correct side of the mirrored memory will be accessed and used. A valid memory image means the data stored in memory is associated with the disk drives currently installed in the array. Hereafter, the controller with the valid memory image will be referred to as the MASTER controller. Initialization may occur during power up or during a reset of a controller, i.e., after an error or controller card replacement has occurred. One factor in this decision is whether or not these two controllers have been operating together previously, i.e., whether they have been operating in the same assembly on the same set of disk drives and, thus, constitute a controller pair.

Accordingly, the object of the present invention is to provide a means for determination of who is the MASTER controller upon initialization in a dual controller disk storage system for preserving the integrity of the mirrored memory contents.

SUMMARY OF THE INVENTION

According to principles of the present invention in its preferred embodiment, in a disk storage system having dual controllers and mirrored memory therebetween, a controller identification system provides a unique system identifier (ID) data (number, password, etc.) accessible by both controllers for determination of which controller is MASTER. This identifier is physically mounted in a location that will always remain accessible by the controllers, such as in the enclosure containing the drive array. Typically, a read-only memory (ROM) stores the identifier.

During initialization, each controller reads this system identifier data and compares it to a respective controller identifier data previously stored in a non-volatile memory area of each controller. If the system identifier matches the controller identifier, the controller has not been moved and, therefore, has a valid memory image. This controller may then become a MASTER controller. A MASTER bit signal is then checked; and, if it is set, the controller was previously the MASTER controller and will continue as MASTER controller. If the identifiers do not match, the controller is a new arrival and the system identifier is stored in the controller non-volatile memory for reference upon the next initialization after that memory is made valid.

Basically, each of the disk controllers access a common system identifier number within the disk system assembly and "read" this system identifier number during an initialization process. On completion of reading the number, each controller compares the system number to a controller identifier number stored in its own memory. The options as a result of this comparison then are:

(1) the system identifier matches the controller identifier, therefore, the controller has been used in this assembly before;

(2) the system identifier does not match the controller identifier, therefore the controller has not been used in this assembly before; or (3) there is no stored controller identifier in the controller to compare with the system identifier (this would indicate a new and unused controller).

The results of these read actions are also compared between controllers, i.e., controller A results are compared with controller B results. This comparison between controllers provides options and results as follows:

(1) If both controllers match the stored system identifier number, then an arbitrary decision is made as to which controller is MASTER. In the preferred embodiment, the previous master is selected as MASTER. The "previous" master is determined by reading a MASTER bit signal in the non-volatile memory of each controller. The MASTER bit signal is set by a controller when it is MASTER. Thus, the controller whose MASTER bit is set was the "previous" MASTER controller and will continue as the MASTER controller.

(2) If controller A matches the system ID number and controller B does not match the system ID number, then controller A is master and controller B memory is made consistent with controller A.

(3) If controller B matches the system ID number and controller A does not, then controller B is master and controller A memory is made consistent with controller B.

(4) If neither controller matches the system ID number, then controller A (or B) is arbitrarily selected as master and the memories are made consistent.

(5) If either or both controllers do not have a controller identifier number that matches the system identifier number, then the system ID number is written to that controller memory.

The computer dual disk storage controller system to carry out these functions comprises the following:

a first and second disk controller, each controller having mirrored memory with respect to each other;

means for communicating between controllers;

means for each controller to communicate to a disk drive array within the disk storage controller system;

each controller having a means for reading a system identifier number;

each controller having means for storing a system identifier number within the controller;

each controller having means for comparing the system identifier number with a stored controller identifier number in each of the mirrored memories;

each controller having means for selection of a master controller, selection means further comprising:

arbitrary selection of a new MASTER controller in the case wherein both controller numbers match the system identifier number;

selection of the first controller as MASTER wherein the first controller number matches the system identifier number and the second controller number does not match the system identifier number;

selection of the second controller as MASTER wherein the second controller number matches the system identifier number and the first controller number does not match the system identifier number; and selection of the first controller as MASTER wherein neither controller number matches the system identifier number.

Other objects, advantages, and capabilities of the present invention will become more apparent as the description proceeds.

DETAILED DESCRIPTION OF THE INVENTION

Figure 1:
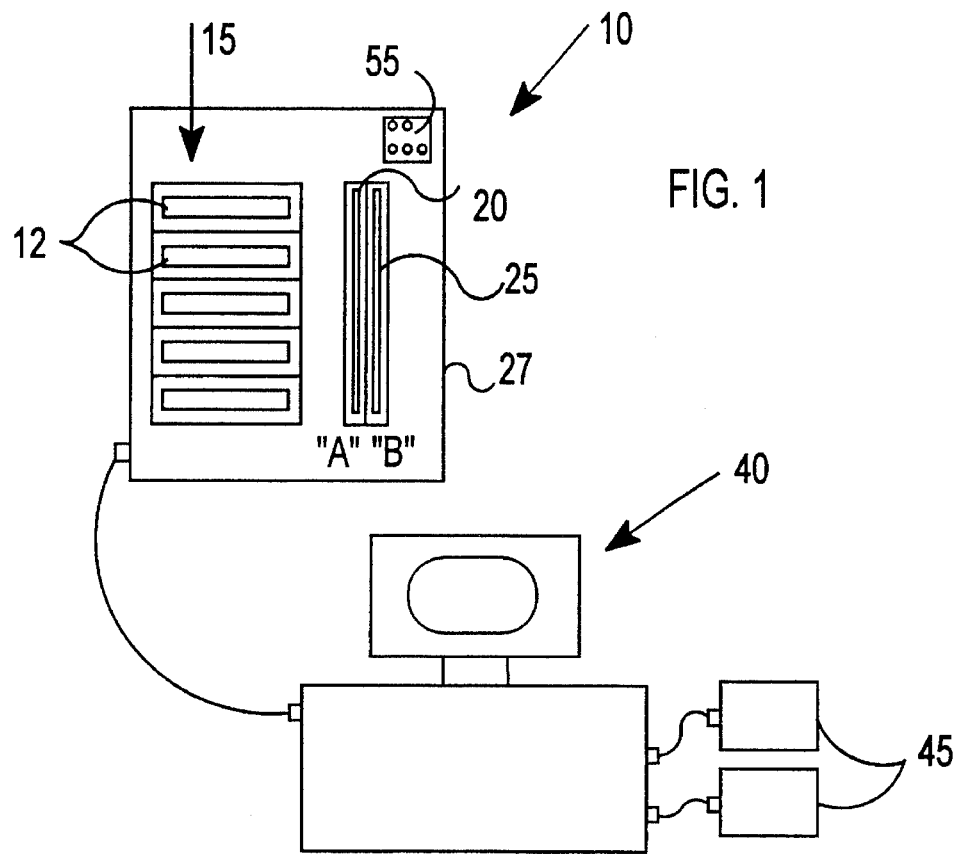
FIG. 1 a block diagram illustrating the components of the present invention for identifying controller pairs in a dual controller disk storage system.
Figure 2:
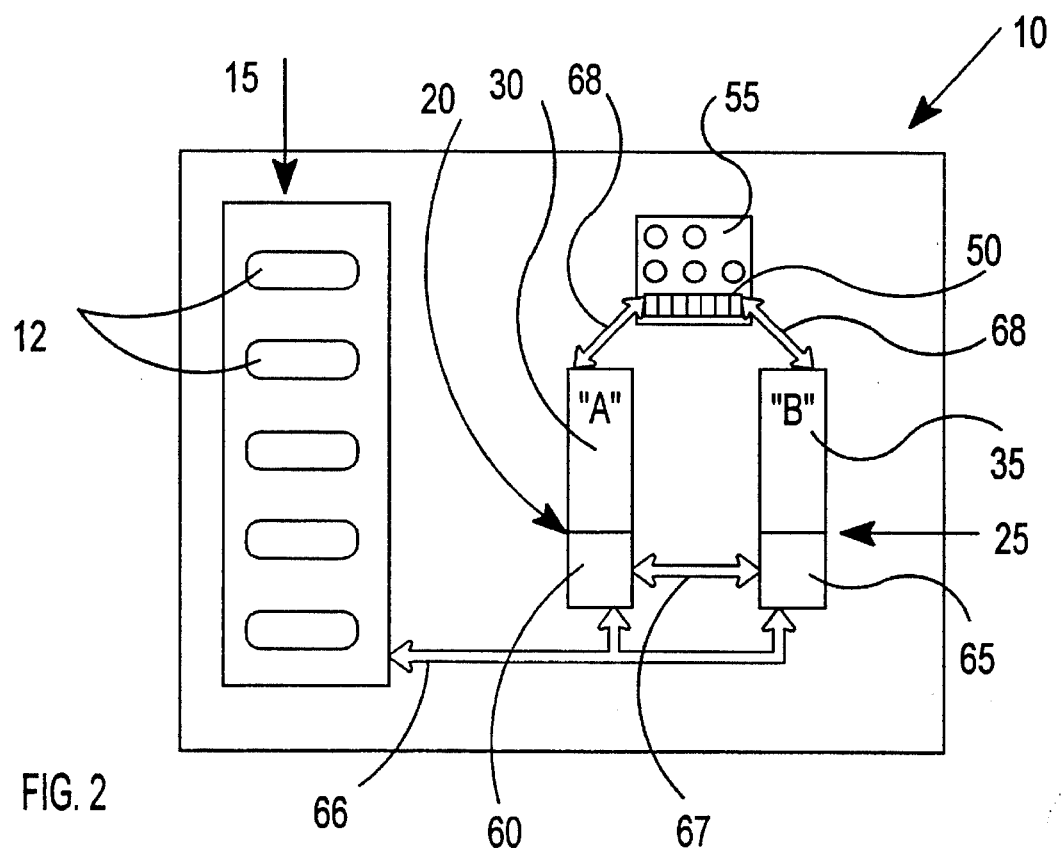
FIG. 2 is a block diagram of the controller pairs within the disk storage system of the/present invention.

FIG. 1 is a system diagram representing an overview of the present inventive system for identifying controller pairs in a dual controller disk array. A disk storage system is depicted generally at 10, having disk storage devices 12 depicted generally at disk drive array 15, and dual disk storage controllers depicted at 20 and 25 within enclosure 27. Controllers "A" 20 and "B" 25 each have memory 30 and 35, respectively (FIG. 2).

Although most any type of Random Access Memory (RAM) is suitable for use as memory 30 and 35, in the preferred embodiment a nonvolatile RAM (or volatile RAM made non-volatile by use of a power supply backup) is used to allow for retention of data in the event of a power failure.

Each memory 30 and 35 is a mirrored memory. As is well known in the art, mirrored memory simply means that data in one memory is duplicated or "mirrored" in another memory. As used in the present invention, mirrored memory means that data in the memory of one controller is duplicated or "mirrored" in the memory of the other controller.

In a preferred embodiment, disk controllers 20 and 25 include disk control logics 60 and 65 that, among other functions, control selection of which controller is MASTER. In alternate embodiments, the control logic may be in a central location separate from the controllers. Disk storage system 10 is shown as a separate component from the computer 40 and peripheral devices 45 but could be contained within a common enclosure.

One of the key features, the disk assembly system identifier (ID) number, is stored in a memory device 50 (FIG. 2) and in a preferred embodiment, on the Liquid Crystal Display (LCD) assembly 55. The device 50 can typically be a ROM.

This system ID number in memory device 50 is "read" by each controller 20 and 25 during initialization. This system ID number may then be stored in each non-volatile memory 30 and 35 for future initialization procedures. The system ID is used as a common reference number to identify whether a controller 20 or 25 has been replaced by a new controller. Consequently, each controller can determine who will become the MASTER controller.

A replaced controller can have a previously stored controller ID number from another disk storage system or have no number, in the case of a new and unused controller. In either case, each of the controllers will have its memory image made consistent and the system ID number of the array assembly written into its memory.

Communication between the controllers and disk array 15 is through the disk assembly backplane at 66. Communication between controller 20 and 25 and with the system ID memory device 50 are also via the backplane at 67 and 68, respectively.

Figure 3:
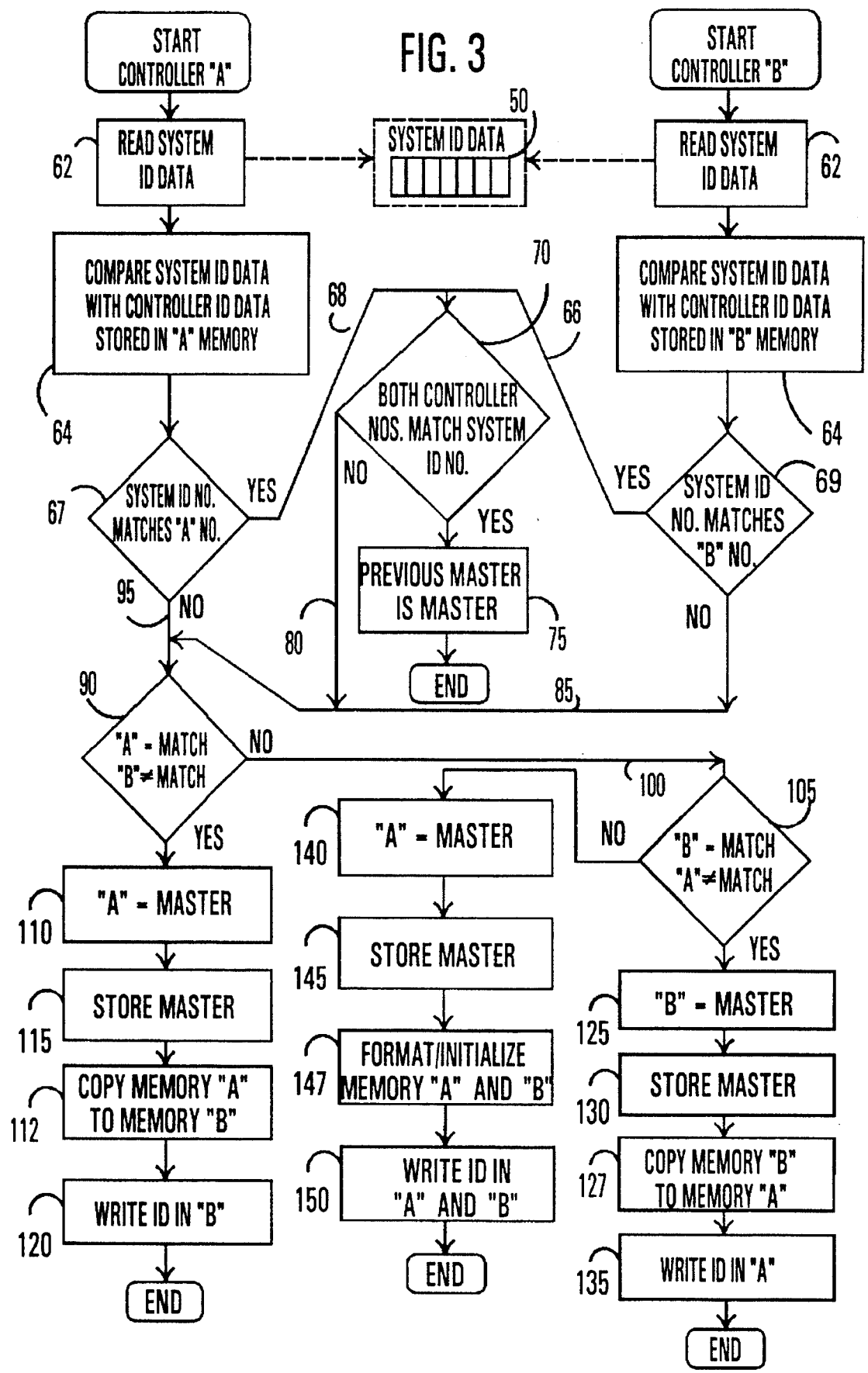
FIG. 3 is a flow chart depicting the steps followed in an exemplary communication between mirrored memory controllers and a disk system identifier number according to the present invention system and method.

Operation of the disk storage system will be described by referring to the flow diagram of FIG. 3. During initialization, controller 20 (designated as "A") and controller 25 (designated as "B") read 62 the system ID data in memory device 50. Each controller then compares at 64 the system ID data with a stored controller data in their respective memories 30 and 35.

In a first case where both stored controller numbers match the system ID as at 67, 69, and 70, the previous MASTER can be arbitrarily assigned as current MASTER as at 75.

In a second case, where the stored data in "A" controller matches the system ID data 67 and 68 and the stored number in "B" does not match the system ID 69 and 85, then (via reference points 80, 85, and 90) "A" controller is MASTER, 110. The memory image on controller A" is then copied to controller "B" as at 112. Controller "A" then sets (stores) its MASTER bit signal in its memory 30 to a TRUE or one value, 115. When the MASTER bit is set, it indicates that this controller is MASTER. At this time, the system ID data is written 120 into "B" memory 35, and the "B" memory MASTER bit is set to FALSE or zero.

In a third case where the stored data in "B" controller matches the system ID data (69, 66) and the stored data in "A" controller does not match the system ID data (67, 95), then (via reference points 95, 80, 90, 100, and 105) controller "B" becomes MASTER, 125. The memory image on controller "B" is then copied to controller "A" as at 127. The "B" MASTER bit is set to TRUE 130, and the system ID data is written to "A" controller 135.

In a fourth case, if neither "A" nor "B" controllers had the system ID data stored, then controller "A" is arbitrarily designated as MASTER 140, the "A" MASTER bit is set (stored) 145, memories A and B are formatted and initialized 147, and the system ID is written in both controller "A" and "B", 150.

In summary, what is disclosed is a system and procedure for selecting a MASTER controller upon initialization from a pair of controllers, where the preferred MASTER is a controller that has previously been the MASTER in the disk storage system to preserve mirrored memory integrity. In the case where neither controller has previously been the MASTER, an arbitrary selection is made.

It will be obvious to one of ordinary skill in the art that the present invention is easily implemented utilizing any of a variety of hardware and software tools existing in the art.

While the present invention has been described by reference to specific embodiments, it will be apparent that other alternative embodiments and methods of implementation or modification may be employed without departing from the true spirit and scope of the invention.

What is claimed is:

1. A controller identification system for a computer disk storage control system having a plurality of controllers, comprising:
   (a) means for reading a system identifier data;
   (b) means for comparing the system identifier data with a controller identifier data associated with each of the controllers and to produce a compare result for each controller, the compare result indicative of whether the respective controller was previously used in the disk storage control system; and,
   (c) means for selection of a master controller based on the compare result of each controller.

2. The system as recited in claim 1 wherein one of the controllers is arbitrarily selected as a new master controller in a case where each controller identifier data matches the system identifier data.

3. The system as recited in claim 1 further including means for reading a master bit signal data associated with each of the controllers, and wherein a previous master is selected as the master controller in a case when each controller identifier data matches the system identifier data, the previous master being one of the plurality of controllers which has its master bit signal set.

4. The system as recited in claim 3 further including means for storing the master bit signal data in a non-volatile memory of each controller.

5. The system as recited in claim 1 wherein the means for selection of a master controller selects a first controller as master in a case where the first controller identifier data matches the system identifier data and the other of the plurality of the controllers identifier data do not match the system identifier data.

6. The system as recited in claim 1 wherein the means for selection of a master controller arbitrarily selects a first controller as master in a case where none of the controller identifier data matches the system identifier data.

7. The system as recited in claim 1 further comprising means for storing the system identifier data in each controller memory.

8. The system as recited in claim 7 wherein the system identifier data is written to the memory of any of the controllers not having a stored controller identifier data match with the system identifier data.

9. The system as recited in claim 1 wherein the system identifier data is stored in a non-volatile memory external to the controller within an enclosure containing the disk array.

10. The system as recited in claim 1 wherein selection of the master controller is activated during controller initialization.

11. The system as recited in claim 1 further including means for communicating between the controllers for comparing each controller identifier data with each other and for copying data from one controller to another.

12. A computer disk controller system comprising:
   (a) a first and second disk controller, each controller having mirrored memory with respect to each other;
   (b) means for communicating between controllers;
   (c) means for each controller to communicate to a disk drive array within the disk controller system;
   (d) each controller having a means for reading a system identifier number;
   (e) each controller having means for reading and storing a controller identifier data within the controller;
   (f) each controller having means for comparing the system identifier data with the stored controller identifier data in each of the mirrored memories;
   (g) each controller having means for selection of a master controller, selection means further comprising:
      (i) arbitrary selection of a master controller as a new master controller in the case where both controller identifier data match the system identifier data;
      (ii) selection of the first controller as master wherein the first controller identifier data matches the system identifier number and the second controller identifier data does not match the system identifier data;
      (iii) selection of the second controller as master wherein the second controller identifier data matches the system identifier data and the first controller identifier data does not match the system identifier data;
      (iv) selection of the first controller as master wherein neither controller identifier matches the system identifier data; and
      (v) selection of a master controller is stored in the master controller memory as a TRUE data bit and a slave controller is stored as a FALSE data bit.

13. The system as recited in claim 12 wherein a controller not having a stored identifier data match with the system identifier data has the identifier data written to that controller memory.

14. The system as recited in claim 13 wherein the system identifier data is stored in a non-volatile memory within an enclosure containing a disk array.

15. The system as recited in claim 14 wherein master controller selection is activated during controller initialization.

16. In a dual controller disk storage system, a method of selecting a master controller and a slave controller comprising:
   (a) reading a unique system identifier data within the disk storage system by a first and second disk controller;
   (b) comparing the system identifier data with stored controller data in non-volatile memory within the first and second disk controller, thereby determining whether a match exists, a match indicative that the respective controller was previously used in the disk storage control system; and,
   (c) selecting a master controller based on compare results for each controller from the comparing step.

17. The method as recited in claim 16 wherein one of the controllers is arbitrarily selected as master when both the first and second stored controller data match the system identifier data.

18. The method as recited in claim 16 wherein selecting a master controller further comprises selecting the first controller as master when the first stored controller data matches the system identifier data and the second stored controller data does not match the system identifier data.

19. The method as recited in claim 16 wherein selecting a master controller further comprises selecting the first controller as master when neither the first nor second stored controller data matches the system identifier data.

20. The method as recited in claim 16 wherein selecting a master controller further comprises setting a selected master controller memory bit to TRUE and setting a slave controller memory bit to FALSE to identify a previous master controller and writing the system identifier data to either controller memory that has a stored controller data that does not match the system identifier data.

* * * * *